United States Patent Office 2,699,433
Patented Jan. 11, 1955

2,699,433

PREPARATION OF SPINNING MIXTURES

Duane Lionel Green, Kenmore, N. Y., and Weston Andrew Hare, Waynesboro, Va., assignors to E. I. du Pont de Nemours & Company, Wilmington, Del., a corporation of Delaware No Drawing. Application March 30, 1950,
Serial No. 152,988

15 Claims. (Cl. 260—30.2)

This invention relates to the preparation of acrylonitrile polymer dopes of high solids content and, in particular, to a process for polymerizing or copolymerizing acrylonitrile in a dispersion medium in the presence of an agent which is a plasticizer for the polymer to yield a homogeneous composition of matter which can be melted and shaped into articles.

Polyacrylonitrile and copolymers of acrylonitrile with other polymerizable substances, for example vinyl or acrylic compounds, in which at least 85% by weight of the polymer is acrylonitrile, have been known for some time and recognized as possessing desirable physical and chemical properties, including toughness and insolubility in, and insensitivity to, common organic solvents such as methyl or ethyl alcohol, acetone, ethyl ether, ethyl acetate, hydrocarbon solvents, chlorinated hydrocarbons, and the like. Because of these facts numerous attempts have been made to form these polymeric materials into yarns, films and other shaped articles.

Various classes of organic materials which act as solvents and plasticizers for these acrylonitrile polymers are described in U. S. 2,404,714–U. S. 2,404,727, inclusive, and in French 883,764. It is disclosed in these references that the solutions of polyacrylonitrile can be converted into shaped articles by means of dry- and wet-spinning and casting techniques. The high molecular weight polymers necessary for the preparation of shaped articles having outstanding physical properties can be used in solution concentrations up to about 22% in dry- and wet-spinning operations. In the case of yarn preparation, the spinning speeds are limited by the rate of evaporation of the solvents in dry-spinning and by the rate of coagulation of the polymer in a suitable wet-spinning bath.

Materials such as glass and polyamide linear condensation polymers can be shaped into articles such as filaments, for example, at much higher rates of speed by means of melt-casting or melt-spinning techniques. The formation of shaped articles from polyacrylonitrile melts, however, is exceedingly difficult because acrylonitrile polymers containing at least 85% by weight of acrylonitrile cannot be melted without decomposition. With certain materials these acrylonitrile polymers can be mixed to form compositions containing up to 60% and more of the polymer, which compositions can be melt-spun into filaments at high rates of speed, for example 500 yds./min. These compositions of matter are non-tacky solids at ordinary temperatures so that an evaporative or coagulating medium is not required in the process for shaping articles therefrom. There is available a process for the preparation and spinning of such compositions of matter, particularly acrylonitrile polymer/ethylene cyclic carbonate mixtures. The preparation of such compositions by mixing polymer and plasticizer for the polymer, entails a hot milling cycle of ½ hour or more. In many cases this leads to discoloration and a considerable lowering of the intrinsic viscosity of the polymer. The discoloration is particularly undesirable in the preparation of a yarn having wide commercial utility.

Accordingly, it is an object of this invention to prepare useful homogeneous compositions of matter, comprising an arcylonitrile polymer containing at least 85% by weight of acrylonitrile and a plasticizer for the polymer. It is a further object to provide such compositions of matter which are suitable for melt-shaping into filaments, films, and molded articles. It is a particular object of this invention to provide a process for the preparation of such compositions of matter which eliminates the necessity for an extended hot milling cycle. Other objects will become apparent from the description which follows.

These objects are accomplished by means of a process which comprises polymerizing acrylonitrile, alone or together with a minor portion of one or more polymerizable ethylenically unsaturated monomers, in the presence of a material which is a plasticizer for the polymer to be formed, the mixture being emulsified in an inert liquid medium which is a non-solvent for the polymer and which is immiscible with the plasticizer. The ingredients may be mixed in any manner for they are chosen so that the monomers are more soluble in the plasticizer than in the inert medium and the plasticizer will extract the monomers from the inert medium. A heterogeneous system results containing the monomer/plasticizer phase and the immiscible inert liquid phase. Polymerization of the monomers occurs in the monomer/plasticizer phase, and since this is dispersed and since the resultant polymer is insoluble in the inert phase, a granular product comprising an intimate mixture of polymer and plasticizer is obtained. The homogeneous polymer/plasticizer mixture is prepared of any desired molecular weight and solids content and is readily removed from the inert medium by filtration. After drying, the uniform polymer/plasticizer mixture, usually prepared with a high solids content of about 35% to about 60%, is ready for melt-shaping into articles, such as yarns, films and the like.

The process of this invention can best be understood by reference to the following examples which are illustrative and not to be construed as limitative, and in which parts and percentages are by weight unless otherwise specified.

*Example I*

In a container, equipped with a stirrer and nitrogen bleed, were placed 137 parts of heptane and 50 parts of ethylene cyclic carbonate. After the container and its contents had been freed of air by purging with nitrogen for one hour, 59.5 parts of acrylonitrile was added together with 2.2 parts of starch. The resulting mixture was adjusted to a temperature of 50° C. by means of a water bath. The polymerization was then started by adding 0.48 part (0.8% based on the weight of monomer) of alpha, alpha'-azobis-alpha, gamma-dimethylvaleronitrile. The polymerization was conducted for 4 hours, maintaining the temperature at 50° C. and stirring the mixture vigorously. At the end of this time the granular slurry was filtered, washed with hexane and dried in air. The conversion of monomer to polymer was 69.7% and the resulting granular product, after drying, comprised 46% of polyacrylonitrile, having an intrinsic viscosity of 3.8, and 54% of cyclic ethylene carbonate. This composition of matter was a non-tacky solid at ordinary temperatures. It could be heated to a temperature of 150° C. and forced through a spinneret into the shape of fine filaments which solidified at ordinary temperatures and could be collected on a bobbin rotating at high speed.

*Example II*

In the manner described in Example I, 274 parts of heptane and 50 parts of tetramethylene cyclic sulfone were placed in a container and purged of air by bubbling nitrogen through the mixture for 1 hour. 66.6 parts of acrylonitrile and 1 part of "Alkanol" WXN (Du Pont Co.; the sodium salt of a saturated hydrocarbon sulfonate, a conventional dispersing agent) were then added and the mixture stirred at a temperature of 50° C. When the resulting mixture had been adjusted to the temperature of the bath, 1.1 parts (1.65% based on the weight of monomer) of the azobis-dimethylvaleronitrile catalyst were added. The polymerization was conducted for a period of 7 hours at the temperature of 50° C. At the end of this time, the granular slurry was filtered and washed with hexane. The dried product comprised 54% of acrylonitrile polymer and 46% tetramethylene cyclic sulfone. There was obtained a conversion of 81% of the acrylonitrile into a polymer having an intrinsic viscosity of 1.3. The resulting polymer/plasticizer composition was a non-tacky solid which could be melt-spun on standard type equipment into filaments at the rate of 500 yds./min.

Example III

The following mixture was prepared in a container and freed of air by purging with nitrogen for 1 hour.

264 parts of hexane
60 parts of N-acetylmorpholine
2.6 parts of 2-vinylpyridine
64 parts of acrylonitrile
1 part of "Alkanol" WXN With stirring, the mixture was heated to 40° C., after which 1.66 parts of alpha, alpha'-azobis (alpha, gamma-dimethyl-gamma-methoxyvaleronitrile) was added. The polymerization was conducted at 40° C. for a period of 6.5 hours, after which the granular slurry was filtered and washed with hexane. The dried product was a composition comprising 46% of N-acetyl-morpholine and 54% of a copolymer having the composition of 95% acrylonitrile and 5% 2-vinylpyridine. All of the 2-vinylpyridine and 77% of the acrylonitrile were converted into a copolymer having an intrinsic viscosity of 1.9. This homogeneous composition could readily be melted and spun into filaments at very high rates of speed. Other vinyl pyridines, such as 5-ethyl-2-vinylpyridine and 5-vinyl-2-methylpyridine can be used.

Since the desired products to be made by this invention are solutions which are solid at ordinary temperatures, the customary solution polymerization methods are not used. The process of this invention makes possible the preparation of highly useful solutions of maximum uniformity by causing the polymerization of the monomer to take place in a plasticizer in which it is dissolved and which in turn is dispersed in a non-solvent. The inert medium serves as a vehicle in which the solution polymerization can be conducted.

In order to obtain a homogeneous spinning dope, it is essential that an inert medium be used, in which the plasticizer is insoluble and that the partition coefficient of monomers, such as acrylonitrile, between the inert medium and the plasticizer be such that the plasticizer completely extracts the monomers from the inert medium. The inert medium should also have a reasonably low boiling point so it can be readily removed from the product. For these reasons the low boiling, liquid aliphatic hydrocarbons, such as the hexanes and heptanes, are particularly advantageous in the process of this invention. Any agent which is a non-solvent for the plasticizer and the polymer may be used and it is preferred to use such an agent which is not as good a solvent for the monomers as is the plasticizer. Water and other oxygen-containing materials are too miscible with the polymer plasticizer to be satisfactory for use as the inert medium in this invention, although such materials may be present in amounts insufficient to upset the desired phases. In the event that the polymer plasticizer is relatively miscible with the inert medium, polymerization will occur in the two phases present. Polymer will then precipitate from the phase containing mostly inert medium and the solids content of the physical mixture that results is too high, being greater than 60%. While these very high solids content mixtures, say 80%, can be used they are not preferred for melt-spinning the polymers into fine denier filaments. The amount of inert medium is not critical and may vary over a wide range of concentration. The objects of this invention cannot be accomplished by simply immersing granular polymers in the plasticizer or mixtures containing the plasticizer for the desired intimate mixture of polymer and plasticizer does not result.

For the above reasons, the low boiling liquid aliphatic hydrocarbons such as the isomeric hexanes, heptanes, and octanes and cyclopentane, cyclohexane, and methyl-cyclohexane are particularly advantageous in the process of this invention. Equally useful are fluorinated hydrocarbons, such as n-amyl fluoride, isoamyl fluoride, and other mono- and difluoropentanes, hexanes, heptanes, perfluorohexane, perfluorocyclohexane, and perfluorododecane. The preferred aliphatic hydrocarbons and fluorinated hydrocarbons boil in the range 40°–100° C.

The preferred plasticizers to be used in this invention are cyclic organic compounds, such as the cyclic esters of carbonic acid, lactones, tetramethylene cyclic sulfone, lactams, dimethyl formamide, and N-acetylmorpholine. These materials are, incidentally, good solvents for acrylonitrile and other vinyl-type monomers and are quite insoluble in the low boiling aliphatic hydrocarbons. In addition, they form compositions of matter which are non-tacky solid solutions at ordinary temperatures with polymers high in acrylonitrile content. These solutions can be readily melt-spun.

In order to prepare polymerization products comprising in the neighborhood of 50% polymer and 50% plasticizer, the amount of plasticizer used should range from about 0.7–0.85 times the monomer concentration. This results from the fact that the monomer is generally not completely converted into polymer. It can readily be seen that polymer compositions containing higher or lower concentrations of plasticizer can be prepared by the process of this invention simply by adjusting the initial concentration of monomer and plasticizer.

To obtain the necessary product uniformity, it is essential that the desired dispersion be maintained throughout the polymerization reaction. This is accomplished by turbulent mixing effected by high speed stirring, combinations of stirrers, or baffles in the flask, or by the use of a stabilizer for the dispersed phase such as starch or an emulsifying agent.

The catalyst employed in the process of this invention should be soluble in the monomer/plasticizer mixture. Such catalysts include the organic peroxides, such as benzoyl peroxide, lauryl peroxide, diethyl peroxide, and the azonitriles described in U. S. 2,471,959. The azonitriles are active at relatively low temperatures and are preferred because their activity is readily destroyed by heating when the reaction is completed.

The intrinsic viscosity of the polymer prepared in accordance with the process of this invention can be varied by operating at different catalyst concentrations and at different temperatures. The polymers prepared may be polyacrylonitrile and copolymers of acrylonitrile with such other materials as the vinyl pyridines, vinyl halides, styrene, methyl vinyl ketone, esters of methacrylic and acrylic acids, vinylidene halides, etc.

There are several advantages to be derived from the process of this invention. Highly useful polymer/plasticizer solutions of high solids content are prepared at low temperatures. The discoloration and degradation which accompany the hot milling process generally employed to prepare such solutions are eliminated. The direct preparation of these useful compositions of matter by means of this invention eliminates the entire mixing step and the equipment involved therein. This invention affords an economical process for preparing highly useful plasticized acrylonitrile polymer mixtures with better uniformity and much better color than has been known in the art.

Any departure from the above description which conforms to the present invention is intended to be included within the scope of the claims.

We claim:

1. A process for the preparation of a mixture of an acrylonitrile polymer containing a major portion of acrylonitrile and a plasticizer for said polymer in which mixture the plasticizer is uniformly distributed which process comprises mixing monomeric material comprising acrylonitrile and said plasticizer in a non-aqueous, non-oxygenated liquid selected from the group consisting of aliphatic hydrocarbons and aliphatic fluorinated hydrocarbons, said liquid being a liquid which is not a solvent for said polymer and which is immiscible with said plasticizer, said monomeric material being more soluble in said plasticizer than in said liquid; forming thereby a heterogeneous system comprising the said monomer and said plasticizer as one phase and the said immiscible liquid as the other phase; polymerizing the said monomers in the said monomer/plasticizer phase to form a granular product comprising an intimate mixture of said polymer and said plasticizer, said mixture containing up to about 80%, by weight based on said mixture, of said polymer; and removing from the said heterogeneous system the resultant precipitated, granular product.

2. A process in accordance with claim 1 wherein said polymer is polyacrylonitrile.

3. A process in accordance with claim 1 wherein said plasticizer is ethylene cyclic carbonate.

4. A process in accordance with claim 1 wherein said plasticizer is tetramethylene cyclic sulfone.

5. A process in accordance with claim 1 wherein said plasticizer is N-acetylmorpholine.

6. A process in accordance with claim 1 wherein said polymer is a copolymer.

7. A process in accordance with claim 1 wherein said polymer is an acrylonitrile/vinylpyridine copolymer.

8. A process in accordance with claim 1 wherein said polymer is an acrylonitrile/2-vinylpyridine copolymer.

9. A process for the preparation of a uniform mixture of a polymer of acrylonitrile containing a major portion of acrylonitrile and a plasticizer for said polymer which process comprises agitating a non-aqueous mixture comprising acrylonitrile, ethylene cyclic carbonate and an aliphatic hydrocarbon to form a dispersion in which the said acrylonitrile and ethylene cyclic carbonate forms one phase and the said hydrocarbon forms the other phase; polymerizing the said acrylonitrile while said mixture is dispersed and forming thereby a granular acrylonitrile polymer/ethylene cyclic carbonate mixture, said granular mixture containing up to about 80%, by weight based on said mixture, of the said polymer.

10. A process for the preparation of a uniform mixture of an acrylonitrile polymer containing a major portion of acrylonitrile and a plasticizer for said polymer which process comprises mixing monomers polymerizable to said polymer, a plasticizer for said polymer, a non-aqueous, non-oxygenated liquid selected from the group consisting of aliphatic hydrocarbons and aliphatic fluorinated hydrocarbons, said liquid being a liquid which is not a solvent for said polymer and which is immiscible with said plasticizer, and a polymerization catalyst to form thereby a dispersion in which the said monomer and said plasticizer constitute one phase of the said dispersion and the said liquid constitutes the other phase of the said dispersion; and polymerizing the said monomers while the said mixture is dispersed, forming thereby a granular acrylonitrile polymer/plasticizer mixture containing up to about 80%, by weight based on said mixture, of said polymer.

11. A process in accordance with claim 10 wherein said plasticizer is present in amounts of about 0.7 to about 0.85 times the concentration of said monomers.

12. A process in accordance with claim 10 wherein said polymerizing is effected at a temperature of about 50° C.

13. A process in accordance with claim 10 wherein said catalyst is soluble in the monomer/plasticizer phase formed in said dispersion.

14. A process in accordance with claim 10 wherein said catalyst is alpha, alpha'-azobis-alpha, gamma-dimethyl-valeronitrile.

15. A process for the preparation of a uniform mixture of an acrylonitrile polymer containing a major portion of acrylonitrile and a plasticizer for said polymer which process comprises mixing monomeric material comprising acrylonitrile, a plasticizer for said polymer and a liquid aliphatic hydrocarbon which is not a solvent for said polymer and which is immiscible with said plasticizer, forming thereby a non-aqueous liquid dispersion in which the said monomeric material and the said plasticizer constitute one phase and the said hydrocarbon constitutes another phase; polymerizing the said monomeric material while the said mixture is dispersed, forming thereby a granular acrylonitrile polymer/plasticizer mixture containing up to about 80%, by weight based on said mixture, of said polymer; and removing said uniform mixture from the said dispersion.

References Cited in the file of this patent

UNITED STATES PATENTS

| Number | Name | Date |
|---|---|---|
| 2,160,054 | Bauer et al. | May 30, 1939 |
| 2,259,180 | Schoenfeld et al. | Oct. 14, 1941 |
| 2,456,360 | Arnold | Dec. 14, 1948 |
| 2,462,354 | Brubaker et al. | Feb. 22, 1949 |
| 2,545,702 | Norris | Mar. 20, 1951 |
| 2,601,251 | Bruson | June 24, 1952 |

FOREIGN PATENTS

| 421,397 | Great Britain | Dec. 12, 1934 |